United States Patent
Kim et al.

(10) Patent No.: US 9,735,842 B2
(45) Date of Patent: Aug. 15, 2017

(54) METHOD AND APPARATUS FOR RELIEVING DOPPLER BROADENING IN WIRELESS ACCESS SYSTEM THAT SUPPORTS SUPER HIGH FREQUENCY BAND

(71) Applicant: LG ELECTRONICS INC., Seoul (KR)

(72) Inventors: Jinmin Kim, Anyang-si (KR); Kitae Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 14/441,801

(22) PCT Filed: Dec. 2, 2013

(86) PCT No.: PCT/KR2013/011063
§ 371 (c)(1),
(2) Date: May 8, 2015

(87) PCT Pub. No.: WO2014/084694
PCT Pub. Date: Jun. 5, 2014

(65) Prior Publication Data
US 2015/0288425 A1 Oct. 8, 2015

Related U.S. Application Data

(60) Provisional application No. 61/731,486, filed on Nov. 30, 2012.

(51) Int. Cl.
*H04B 7/01* (2006.01)
*H04B 7/08* (2006.01)
(Continued)

(52) U.S. Cl.
CPC .......... *H04B 7/01* (2013.01); *H04B 7/0617* (2013.01); *H04L 25/0222* (2013.01);
(Continued)

(58) Field of Classification Search
None
See application file for complete search history.

(56) References Cited

U.S. PATENT DOCUMENTS 5,564,424 A * 10/1996 Yao .................... A61B 8/06
600/455
2002/0172307 A1* 11/2002 Sandberg ............. H04B 7/01
375/344

(Continued)

FOREIGN PATENT DOCUMENTS

CN  1741411  3/2006
CN  1750429  3/2006
(Continued)

OTHER PUBLICATIONS

PCT International Application No. PCT/KR2013/011063, Written Opinion of the International Searching Authority dated Apr. 22, 2014, 12 pages.

(Continued)

*Primary Examiner* — Duc Duong
(74) *Attorney, Agent, or Firm* — Lee Hong Degerman Kang Waimey

(57) ABSTRACT

The present invention provides methods for relieving effective Doppler broadening in performing pin-point beamforming and provides apparatuses for supporting the methods, wherein the methods and the apparatuses are used in a wireless access system that supports a super high frequency band. The method for relieving Doppler broadening in a wireless access system that supports a super high frequency band according to one embodiment of the present invention (Continued)

may comprise the steps of: receiving a downlink signal at a receiving end; estimating a Doppler spectrum for the downlink signal received at the receiving end; and calculating a carrier wave shift value based on the Doppler spectrum estimated at the receiving end.

12 Claims, 11 Drawing Sheets

(51) Int. Cl.
   *H04L 27/26* (2006.01)
   *H04L 25/02* (2006.01)
   *H04B 7/06* (2006.01)

(52) U.S. Cl.
   CPC ...... *H04L 27/2646* (2013.01); *H04L 27/2657* (2013.01); *H04L 27/2692* (2013.01)

(56) References Cited

U.S. PATENT DOCUMENTS

| | | | |
|---|---|---|---|
| 2006/0115011 A1 | 6/2006 | Tsuruta et al. | |
| 2008/0252512 A1 | 10/2008 | Demaj | |
| 2009/0168930 A1 | 7/2009 | Li et al. | |
| 2009/0197535 A1* | 8/2009 | Roh | H04B 7/015 455/62 |
| 2009/0252263 A1 | 10/2009 | Liu et al. | |
| 2010/0080178 A1* | 4/2010 | Cox | H04W 72/048 370/329 |
| 2011/0116386 A1* | 5/2011 | Blanchard | H04B 7/155 370/242 |
| 2011/0158361 A1* | 6/2011 | Dent | H04L 25/022 375/347 |
| 2012/0083299 A1* | 4/2012 | Kruglick | H04B 7/01 455/501 |
| 2012/0087447 A1* | 4/2012 | Yoon | H04L 27/2675 375/343 |
| 2014/0198763 A1* | 7/2014 | Sorrentino | H04B 7/024 370/330 |
| 2015/0147960 A1* | 5/2015 | Hanson | H04B 7/15528 455/23 |

FOREIGN PATENT DOCUMENTS

| | | |
|---|---|---|
| CN | 1783864 | 6/2006 |
| CN | 101273552 | 9/2008 |
| CN | 101667855 | 3/2010 |
| CN | 102571650 | 7/2012 |
| JP | 2006-157663 | 6/2006 |
| JP | 2007-184763 | 7/2007 |
| JP | 2012-085237 | 4/2012 |
| KR | 10-0791824 | 1/2008 |
| KR | 10-2008-0040388 | 5/2008 |
| KR | 10-2008-0078110 | 8/2008 |
| KR | 10-2010-0034838 | 4/2010 |
| KR | 10-2012-0128684 | 11/2012 |
| WO | 2006/070754 | 7/2006 |
| WO | 2012049859 | 4/2012 |

OTHER PUBLICATIONS

Pi, et al., "System Design and Network Architecture for a Millimeter-Wave Mobile Broadband (MMB) System," Sarnoff Symposium, 2011 34th IEEE, May 2011, 7 pages.

Khan, et al., "Millimeter-Wave Mobile Broadband with Large Scale Spatial Processing for 5G Mobile Communication," Fiftieth Annual Allerton Conference, Allerton House, Oct. 2012, 7 pages.

PCT International Application No. PCT/KR2013/011063, Written Opinion of the International Searching Authority dated Apr. 22, 2014, 16 pages.

Paulraj et al, "Improving Capacity, Coverage, and Quality in Wireless Networks by Exploiting the Spatial Dimension," IEEE Signal Processing Magazine, IEEE Service Center, XP011089791, Nov. 1997, 35 pages.

Choi et al, "Design of a Channel-Aware 0FDM Transceiver," IEEE Transcations on Wireless Communications, IEEE Service Center, XP011181449, May 2007, 10 pages.

Lee, "Frequency Offset Estimation with Semi-Coherent Accumulation for CDMA Receivers," IEICE Trans. Commun., Communications Society, XP001510276, Jan. 2008, 4 pages.

European Patent Office Application Serial No. 13858979.1, Search Report dated Aug. 23, 2016, 8 pages.

The State Intellectual Property Office of the People's Republic of China Application Serial No. 201380062457.9 Office Action dated May 10, 2017, 15 pages.

\* cited by examiner

FIG. 7
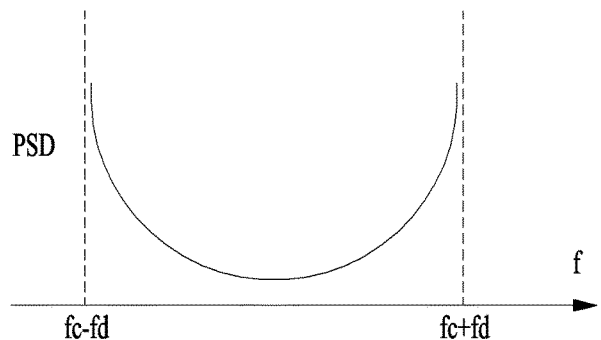
FIG. 8
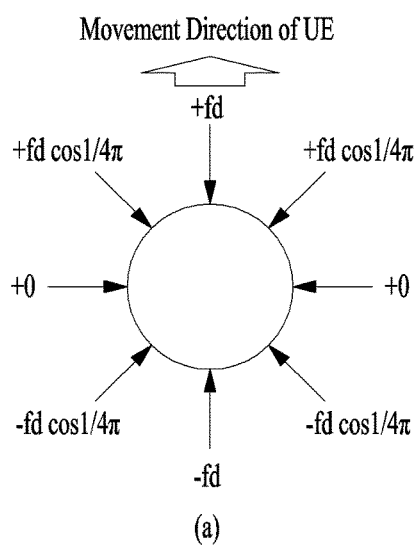
(a)
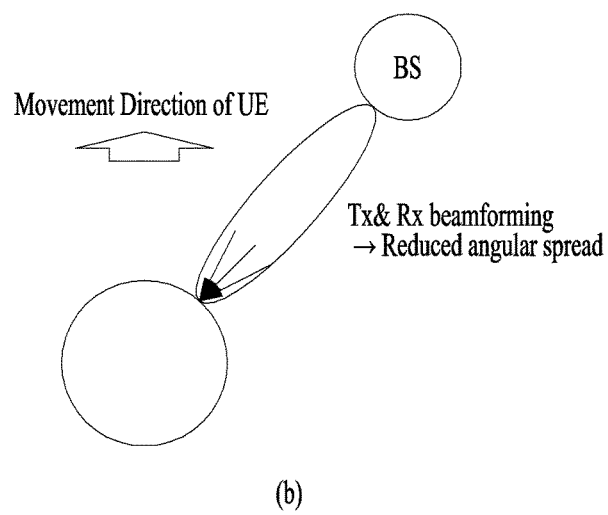
(b)

METHOD AND APPARATUS FOR RELIEVING DOPPLER BROADENING IN WIRELESS ACCESS SYSTEM THAT SUPPORTS SUPER HIGH FREQUENCY BAND

CROSS-REFERENCE TO RELATED APPLICATIONS

This application is the National Stage filing under 35 U.S.C. 371 of International Application No. PCT/KR2013/011063, filed on Dec. 2, 2013, which claims the benefit of U.S. Provisional Application No. 61/731,486, filed on Nov. 30, 2012, the contents of which are all hereby incorporated by reference herein in their entirety.

TECHNICAL FIELD

The present invention relates to a wireless access system supporting a high frequency band, and more particularly, to methods for mitigating an effective Doppler spread when pin-point beamforming is performed and apparatuses supporting the methods.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Compared to legacy wireless access systems, a super-high frequency wireless access system operates with a center frequency of a few GHz to tens of GHz. The super-high frequency characteristics of the center frequency worsen the Doppler effect generated during movement of a User Equipment (UE) or the effects of a Carrier Frequency Offset (CFO) caused by an oscillator error between a UE and a Base Station (BS). For example, the Doppler effect and the CFO increase linearly with respect to the center frequency. The CFO resulting from the oscillator error between the UE and the BS has a large value in units of ppm ($=10^{-6}$)

To overcome the CFO problem encountered with detection of a synchronization signal in a legacy cellular network, a BS transmits a Synchronization Channel (SCH), a pilot signal, and/or a Reference Symbol (RS) to a UE and the UE estimates and/or corrects a CFO using the received signal. However, the super-high frequency wireless access system generates a much larger CFO value than the legacy cellular network. Accordingly, there is a need for defining a synchronization signal/channel in a super-high frequency band and transmitting the synchronization signal/channel in a different manner from in a legacy network, in order to estimate/correct a CFO.

DISCLOSURE

Technical Problem

An object of the present invention devised to solve the problem is to provide a method for mitigating a Doppler spread in a super-high frequency band.

Another object of the present invention is to provide a method for performing pin-point beamforming in a super-high frequency band.

Another object of the present invention is to provide an apparatus for mitigating a Doppler spread in a super-high frequency band.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention is used for a wireless access system supporting a super-high frequency band, and provides methods for mitigating an effective Doppler spread when pin-point beamforming is performed and apparatuses supporting the methods.

In an aspect of the present invention, a method for mitigating a Doppler spread in a wireless access system supporting a super-high frequency band includes receiving a downlink signal by a reception end, estimating a Doppler spectrum of the received downlink signal by the reception end, and calculating a carrier shift value based on the estimated Doppler spectrum by the reception end.

In another aspect of the present invention, a reception end for mitigating a Doppler spread in a wireless access system supporting a super-high frequency band includes a receiver and a processor configured to mitigate the Doppler spread.

The processor may be configured to receive a downlink signal through the receiver, estimate a Doppler spectrum of the received downlink signal, and calculate a carrier shift value based on the estimated Doppler spectrum.

The Doppler spectrum $S_x(f)$ may be estimated to be $\Im\{R_{xx}(\tau)\}$.

$R_{xx}(\tau)$ may represent an auto-correlation function of the downlink signal and $\Im\{\ \}$ may represent Fourier Transform.

The carrier shift value may be calculated to be an average value of a part of the Doppler spectrum larger than a predetermined threshold.

For example, the carrier shift value may be calculated by the following equation.

$$a = \frac{1}{f_{max} - f_{min}} \int_{-f_d}^{+f_d} S_x(f) df, \quad \text{[Equation]}$$
$$S_x^{-1}(a) = k$$

$$f_{min} = \min(f) \text{ when } S_x(f) > \text{threshold}$$
$$f_{max} = \max(f) \text{ when } S_x(f) > \text{threshold}$$

Or the carrier shift value may be calculated by the following equation.

$$k = \frac{f_{max} - f_{min}}{2}, \quad \begin{matrix} f_{min} = \min(f) \text{ when } S_x(f) > \text{threshold} \\ f_{max} = \max(f) \text{ when } S_x(f) > \text{threshold} \end{matrix} \quad \text{[Equation]}$$

The predetermined threshold may be a constant fixed value in the system, may be determined based on a maximum value of the Doppler spectrum, or may be received by higher-layer signaling.

The method may further include feeding back the carrier shift value to a transmission end by the reception end, and receiving a downlink signal corrected based on the carrier shift value from the transmission end by the reception end.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 7 is a view illustrating an exemplary U-shaped Doppler spectrum;

FIG. 8 is a view referred to for describing the a Doppler spectrum and the concept of pin-point beamforming;

BEST MODE

Figure 1:
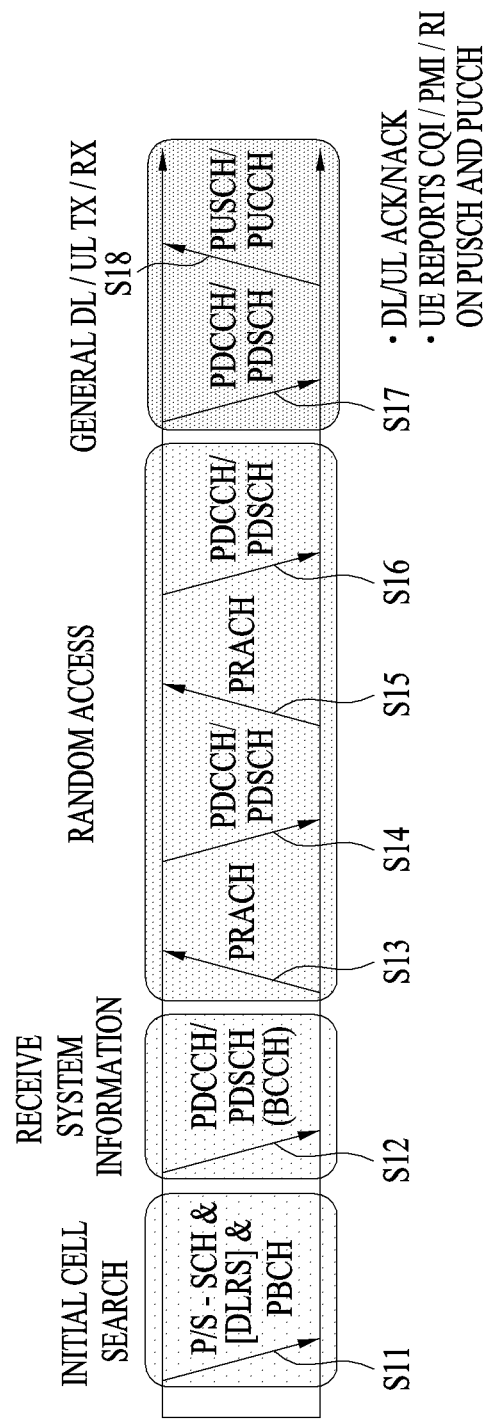
FIG. 1 illustrates physical channels and a general signal transmission method using the physical channels, which may be used in embodiments of the present invention.

Embodiments of the present invention described below in detail are used for a wireless access system supporting a super-high frequency band, and provide methods for mitigating an effective Doppler spread and apparatuses supporting the methods.

The embodiments of the present invention described below are combinations of elements and features of the present invention in specific forms. The elements or features may be considered selective unless otherwise mentioned.

Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, TA is interchangeable with time advance, timing adjustment, or time adjustment in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
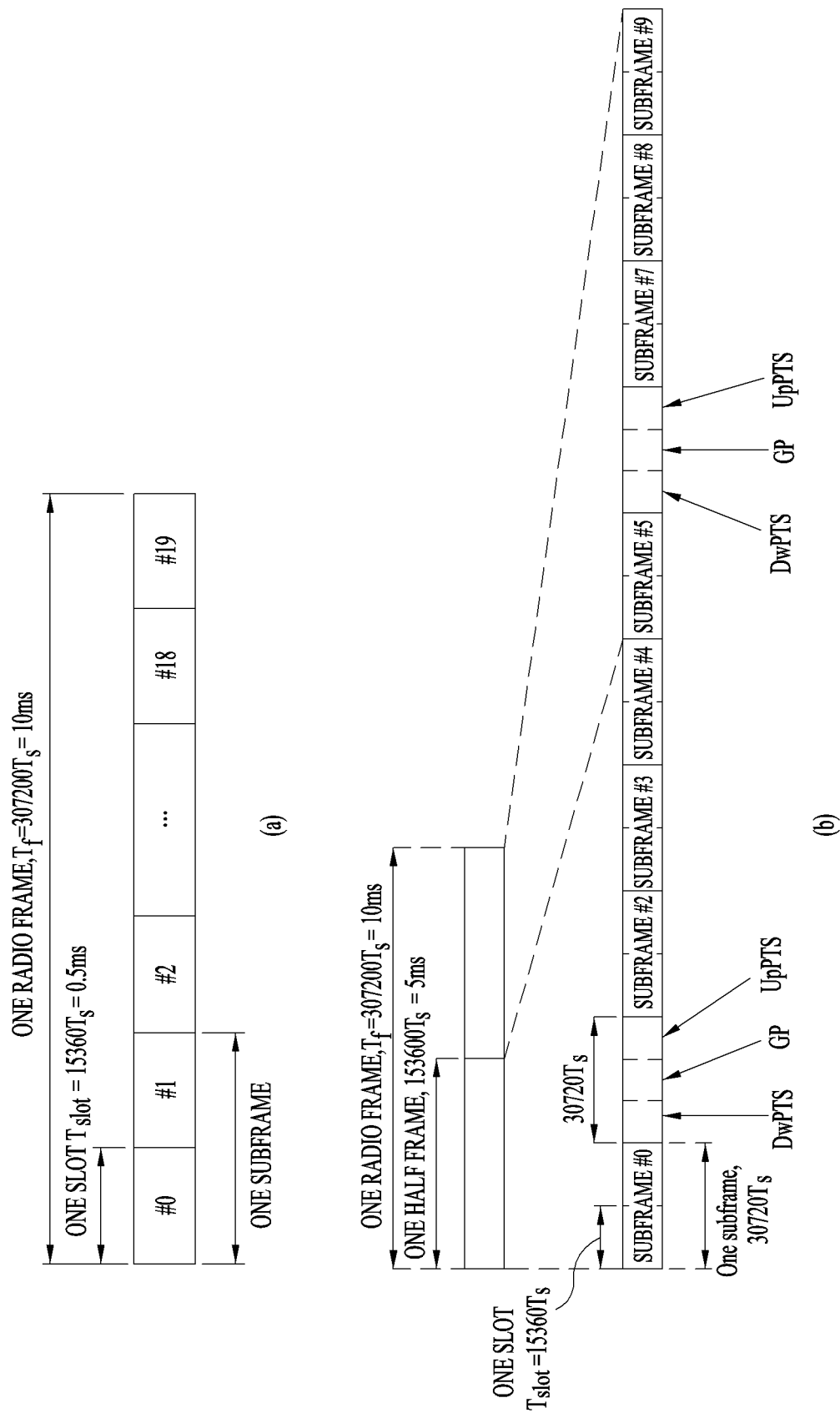
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
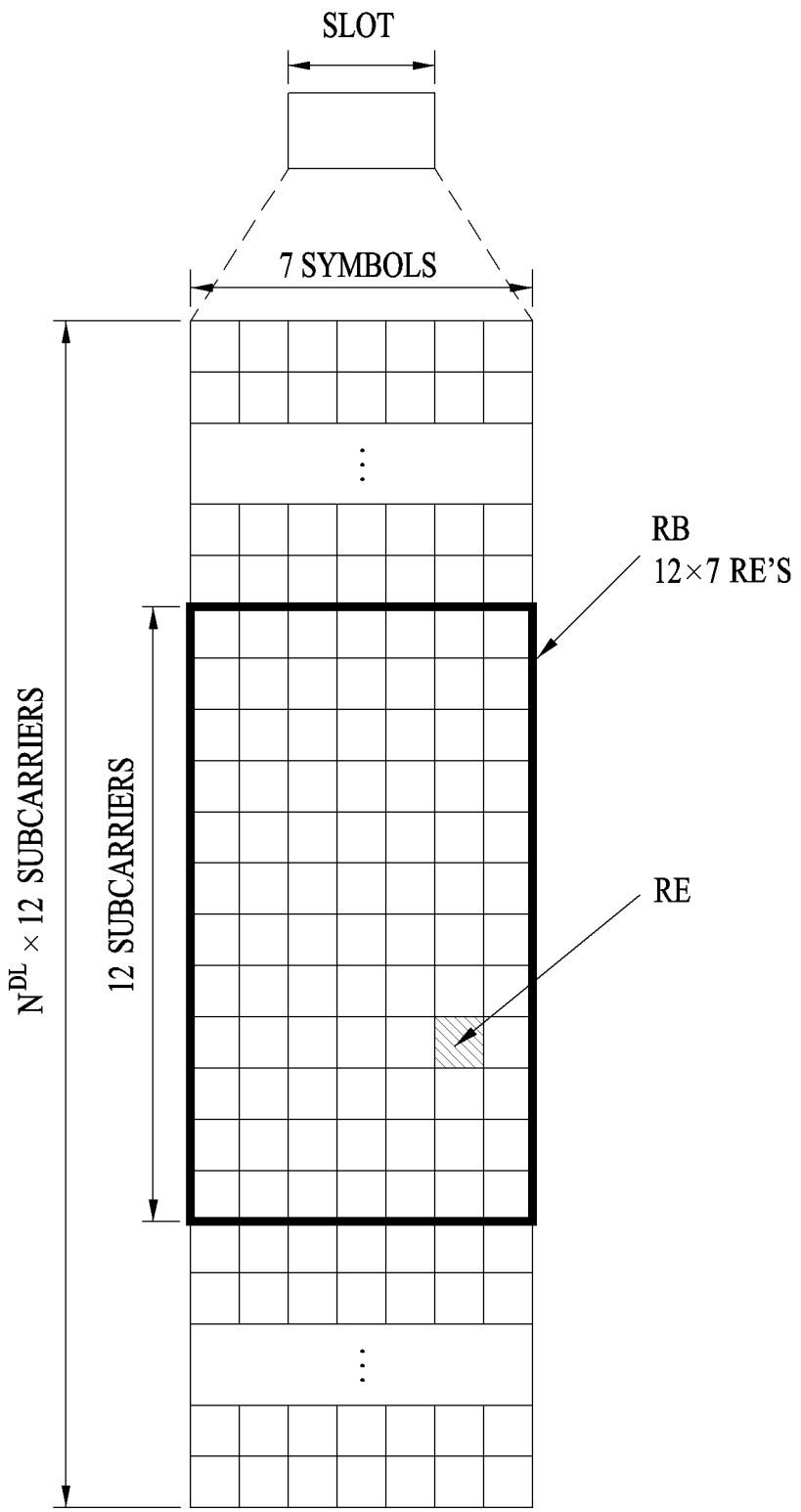
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
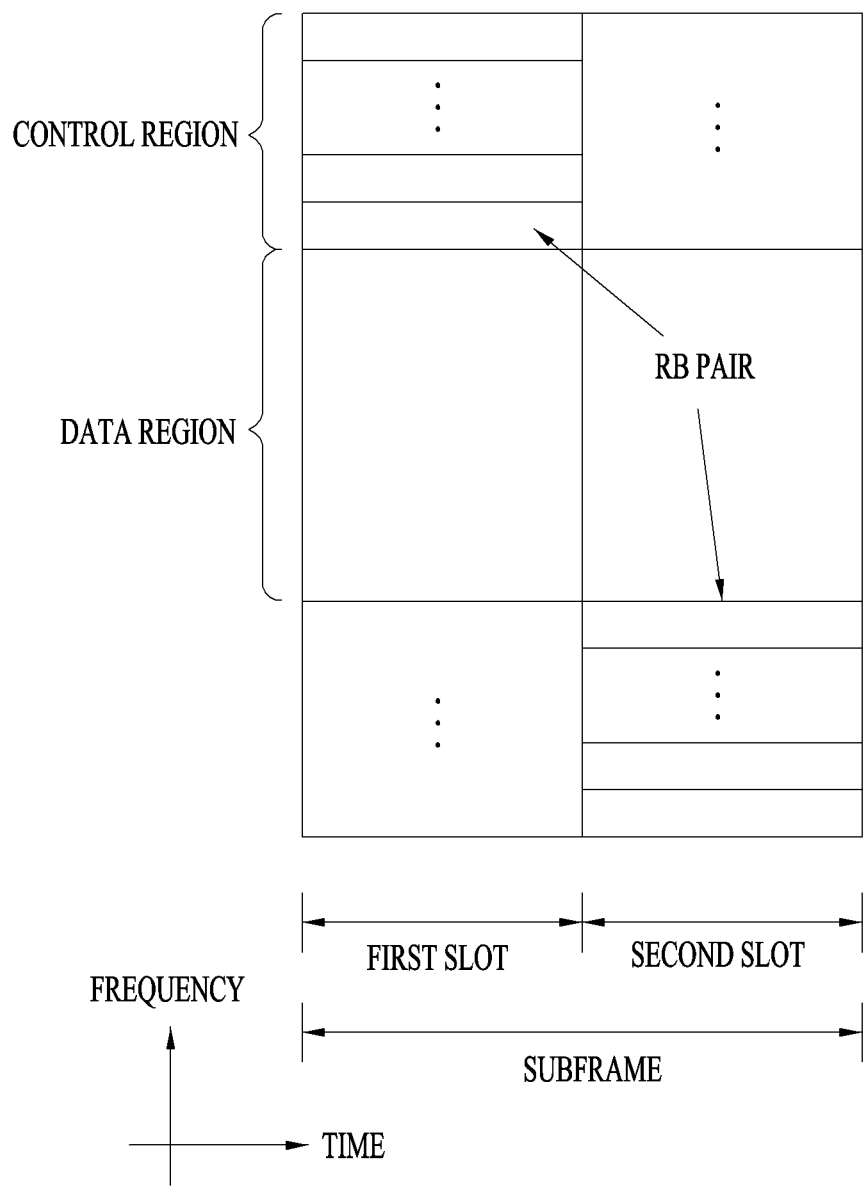
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
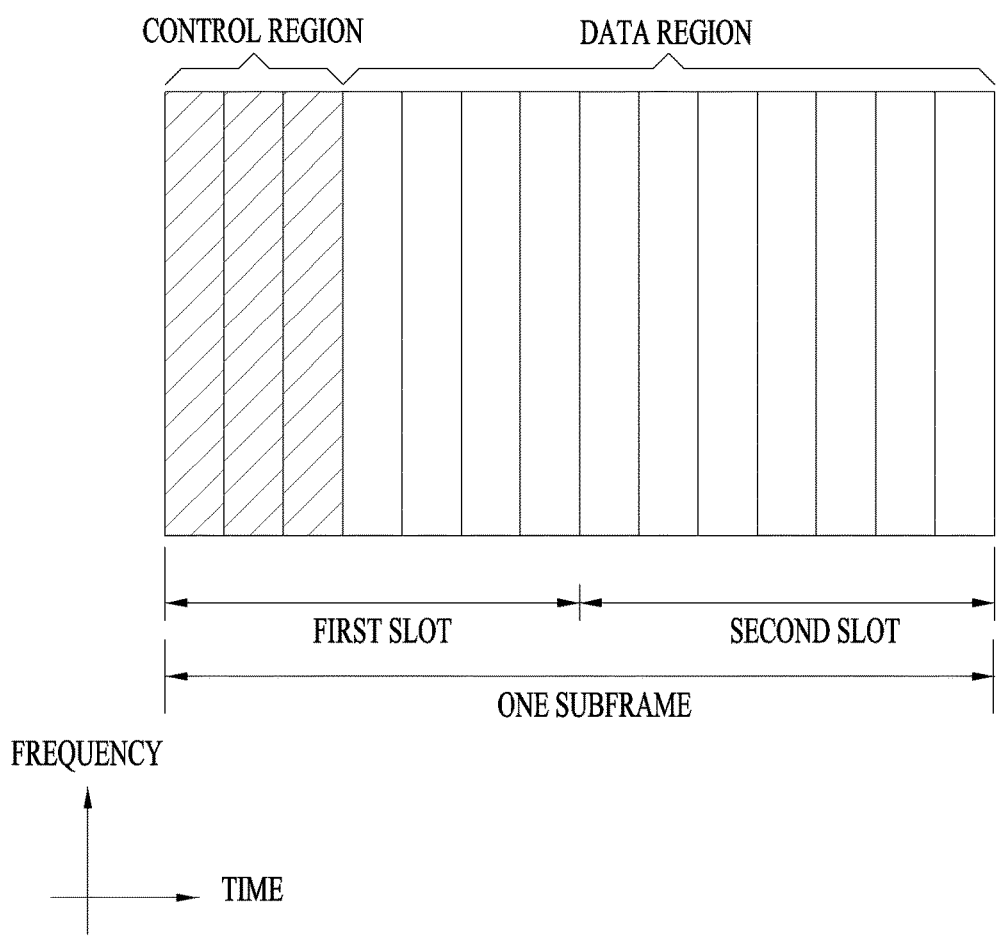
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
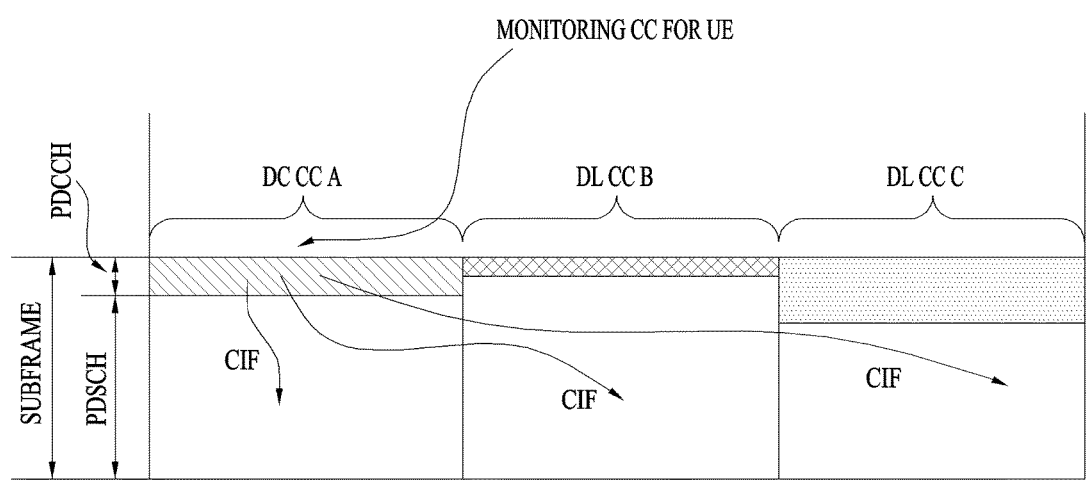
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Synchronization Channel (SCH) in Super-High Frequency Band 3.1 Carrier Frequency Offset (CFO)

An oscillator error value between a UE and an eNB is defined in the LTE-A system. For example, the 3GPP TS 36.101 standard specification requires that a UE should have an accuracy equal to or below ±0.1 ppm during one slot duration, compared to a carrier frequency received from an E-UTRA Node B. Also, the 3GPP TS 36.104 standard specification defines a frequency error as the difference between an allocated frequency and an actual transmission frequency of an eNB.

[Table 2] below lists oscillator accuracies according to BS classes.

TABLE 2

| BS class | Accuracy |
| --- | --- |
| Wide Area BS | ±0.05 ppm |
| Local Area BS | ±0.1 ppm |
| Home BS | ±0.25 ppm |

Therefore, a maximum oscillator error between a UE and an eNB is ±0.1 ppm. If an error is generated in one direction, an offset of up to 0.2 ppm may be given. This ppm value is converted to Hz according to each center frequency by [Center Frequency×Frequency Offset (ppm)]. Meanwhile, an OFDM system experiences a different effect of a CFO value according to a subcarrier spacing.

For example, an OFDM system having a large subcarrier spacing is not affected much by a large CFO value. In this context, it is necessary to represent an actual CFO value (an absolute value) as a relative value that affects the OFDM system. This relative value may be referred to as a normalized CFO expressed as [CFO (Hz)/subcarrier spacing].

[Table 3] lists CFO values according to center frequencies and oscillator offset values.

TABLE 3

| Center frequency | Oscillator offset | | | |
| --- | --- | --- | --- | --- |
| (subcarrier spacing) | ±0.05 ppm | ±0.1 ppm | ±10 ppm | ±20 ppm |
| 2 GHz | ±100 Hz | ±200 Hz | ±20 kHz | ±40 kHz |
| (15 kHz) | (±0.0067) | (±0.0133) | (±1.3) | (±2.7) |
| 30 GHz | ±1.5 kHz | ±3 kHz | ±300 kHz | ±600 kHz |
| (104.25 kHz) | (±0.014) | (±0.029) | (±2.9) | (±5.8) |
| 60 GHz | ±3 kHz | ±6 kHz | ±600 kHz | ±1.2 MHz |
| (104.25 kHz) | (±0.029) | (±0.058) | (±5.8) | (±11.5) |

[Table 3] lists CFO values and normalized CFO values with respect to center frequencies and oscillator offset values. The value of a bracket beside each CFO value indicates a normalized CFO value. In [Table 3], a subcarrier spacing of 15 kH used in LTE Rel-8/9/10 is assumed for a center frequency of 2 GHz, and a subcarrier spacing of 104.25 kH is assumed for center frequencies of 30 GHz and 60 GHz in consideration of the Doppler effect in order to prevent performance degradation. However, these subcarrier spacings are merely exemplary and thus other subcarrier spacings may be applied to the center frequencies. For the convenience of description, the following description is given in the context of a normalized CFO value. Unless otherwise mentioned, a CFO value means a normalized CFO value.

In embodiments of the present invention, CFOs may be divided into integer-multiple CFOs and decimal-multiple CFOs. An integer-multiple CFO is a CFO having a value equal to or larger than integer 1 and a decimal-multiple CFO is a CFO having a fractional value less than integer 1. An integer-multiple CFO is represented as a shift of as many subcarriers as an integer multiple for each integer and a decimal-multiple CFO is represented as a shift of as many subcarriers as a decimal multiple.

3.2 Doppler Effect of Super-High Frequency Band

If a UE moves fast or moves slowly in a high frequency band, a Doppler spread may be large. The Doppler spread causes spreading in the frequency domain, resulting in signal distortion. The Doppler spread may be expressed as $f_{doppler}(v/\lambda)\cos\theta$ where $v$ is the velocity of the UE and $\lambda$ is the wavelength of the center frequency of signal waves transmitted by an eNB or the UE. $\theta$ is the angle of received signal waves and the movement direction of the UE. Considering that the distance between a UE and an eNB is short in many cases under a super-high frequency environment, it is assumed herein that $\theta$ is 0.

Herein, a coherence time $T_c$ is placed in the relationship that $$T_c \approx \frac{1}{f_{doppler}}.$$

If the coherence time is defined as a time interval in which the correlation of a time-domain channel response is 50% or higher, $$T_c \approx \frac{9}{16\pi f_{doppler}}.$$

In the wireless communication system, the relationship between the coherence time and the Doppler spread is generally given as follows, using the geometric mean of the coherence time.

$$T_c = \sqrt{\frac{9}{16\pi f_{doppler}}} = \frac{0.4223}{f_{doppler}} \quad \text{[Equation 1]}$$

This Doppler power spectrum density (hereinafter, referred to as the Doppler spectrum) may have various shapes. If signals are received with the same power from all directions in a rich-scattering environment such as downtown, the Doppler spectrum is U-shaped. If a center frequency is $f_c$ and a maximum Doppler spread value is $f_d$, the U-shaped Doppler spectrum is shown as illustrated in FIG. 7. FIG. 7 is a view illustrating an exemplary U-shaped Doppler spectrum.

In FIG. 7, the horizontal axis represents frequency and the vertical axis represents Power Spectrum Density (PSD).

The super-high frequency wireless communication system is advantageous in that an antenna size is small and a plurality of antennas can be installed in a small space because it is deployed in a high-center frequency band. This advantage enables pin-point beamforming by means of tens to hundreds of antennas. The term pin-point beamforming is interchangeably used with pencil beamforming, narrow beamforming, or sharp beamforming. This pin-point beamforming means that signals are received only at a certain angle, not equi-directionally.

FIG. 8 illustrates a Doppler spectrum and the concept of pin-point beamforming.

Referring to FIG. 8(a), signals are received at a UE equi-directionally. Then, the Doppler spectrum is U-shaped (refer to FIG. 7). On the other hand, pin-point beamforming means that signals are received at a UE only at a certain angle, not equi-directionally.

Referring to FIG. 8(b), an eNB performs pin-point beamforming using a plurality of antennas and a UE receives pin-point-beamformed signals using a plurality of antennas.

Figure 9:
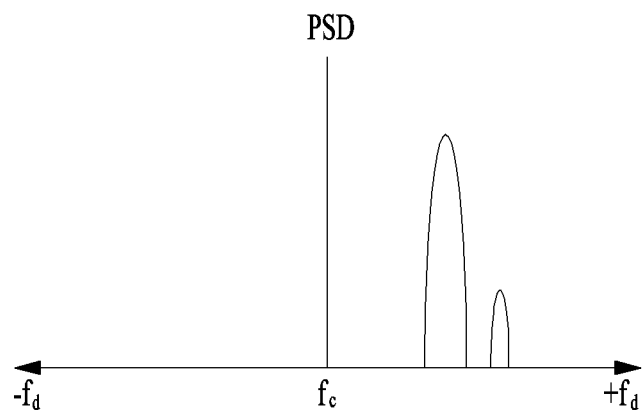
FIG. 9 is a view illustrating an exemplary Doppler spectrum in the case of pin-point beamforming.

FIG. 9 is a view illustrating an exemplary Doppler spectrum in the case of pin-point beamforming.

In FIG. 9, the horizontal axis represents frequency and the vertical axis represents PSD.

If a UE and/or an eNB performs pin-point beamforming, the resulting reduced angular spread causes a Doppler spread only in a specific frequency band, rather than the Doppler spectrum is U-shaped. FIG. 9 illustrates a Doppler spectrum when signals received at a receiver are incident only at a narrow angle, not equi-directionally during pin-point beamforming.

Embodiments of the present invention provide methods applicable to the case where an incident signal has a small angular spread by performing pin-point beamforming. For example, if a Doppler spectrum is present only in a specific frequency band, not distributed across a large range from $-f_d$ to $+f_d$, the embodiments of the present invention relate to methods for estimating the Doppler spectrum and methods for moving the estimated Doppler spectrum to a center frequency.

4. Methods for Mitigating Doppler Spread 4.1 Doppler Spectrum Estimation Method—1

Many algorithms are available for Doppler spectrum estimation to mitigate a Doppler spread. [Equation 2] describes one of the algorithms for estimating a Doppler spectrum.

$$S_x(f) = \Im\{R_{xx}(\tau)\} \quad \text{[Equation 2]}$$

In [Equation 2], $S_x(f)$ represents the Doppler spectrum of an input signal x, $R_{xx}(\tau)$ represents an auto-correlation function of the signal x, and $\Im\{\}$ represents Fourier Transform. The UE and/or the eNB may estimate the Doppler spectrum by [Equation 2].

Figure 10:
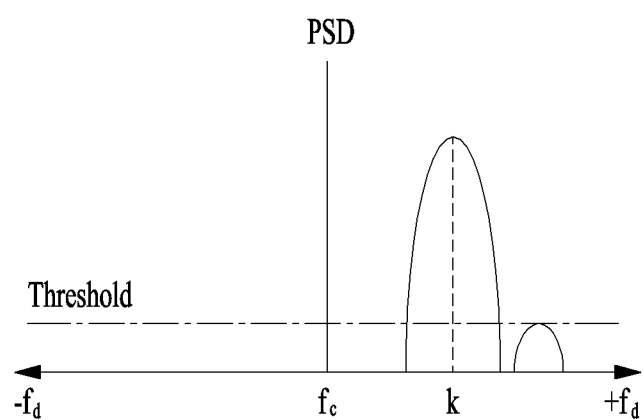
FIG. 10 is a view illustrating an exemplary Doppler spectrum in the case of pin-point beamforming according to an embodiment of the present invention.

FIG. 10 is a view illustrating an exemplary Doppler spectrum in the case of pin-point beamforming according to an embodiment of the present invention.

The Doppler spectrum estimated by [Equation 2] may be illustrated as in FIG. 10. In FIG. 10, $f_c$ represents a center frequency, $f_d$ represents a maximum Doppler spread value, and k represents a carrier shift value by which a Doppler spectrum may have an actual small effective Doppler spread. The vertical axis represents PSD.

In FIG. 10, the UE and/or the eNB may reconfigure $S_x(f)$ only using a PSD higher than a predetermined threshold and determine the carrier shift value using the reconfigured $S_x(f)$ by [Equation 3].

$$a = \frac{1}{f_{max} - f_{min}} \int_{-f_d}^{+f_d} S_x(f) df \quad \text{[Equation 3]}$$

$$S_x^{-1}(a) = k$$

$f_{min} = \min(f)$ when $S_x(f) >$ threshold
$f_{max} = \max(f)$ when $S_x(f) >$ threshold The method described in [Equation 3] means that an average of a part of the Doppler spectrum, larger than the threshold, is calculated and a frequency having the average is determined to be the carrier shift value k.

Or the UE and/or the eNB may calculate k only using a frequency by [Equation 4].

$$k = \frac{f_{max} - f_{min}}{2} \quad \begin{aligned} f_{min} &= \min(f) \text{ when } S_x(f) > \text{threshold} \\ f_{max} &= \max(f) \text{ when } S_x(f) > \text{threshold} \end{aligned} \quad \text{[Equation 4]}$$

Or the UE and/or the eNB may calculate k only using a minimum or maximum value of the frequency by [Equation 5].

[Equation 5]

$$k = f_{min} \text{ or } f_{max} \quad \begin{aligned} f_{min} &= \min(f) \text{ when } S_x(f) > \text{threshold} \\ f_{max} &= \max(f) \text{ when } S_x(f) > \text{threshold} \end{aligned} \quad \text{[Equation 5]}$$

The threshold used in [Equation 3], [Equation 4], and [Equation 5] may be set using one of the following methods.

1. A predetermined constant value may be used fixedly in the system.

2. The threshold may be set as a value relative to a maximum value of $S_x(f)$. For example, an arbitrary relative value may be calculated from among −3 dB to −20 dB with respect to a maximum Doppler shift value according to performance.

3. The eNB may indicate the threshold to the UE by higher-layer signaling. Thus, the threshold may be adjusted semi-statically.

4.2 Doppler Spectrum Estimation Method—2

Unlike the method described in Clause 4.1, the UE may calculate the carrier shift value k using all calculated $S_x(f)$ values. Herein, [Equation 3], [Equation 4], and [Equation 5] may be used.

4.3 Doppler Spectrum Estimation Method—3

A frequency having the maximum of the $S_x(f)$ values calculated in Clauses 4.1 and 4.2 may be set as k. [Equation 6] describes another method for calculating the frequency shift value k.

$$k = f \text{ when } \max(S_x(f)) \quad \text{[Equation 6]}$$

Figure 11:
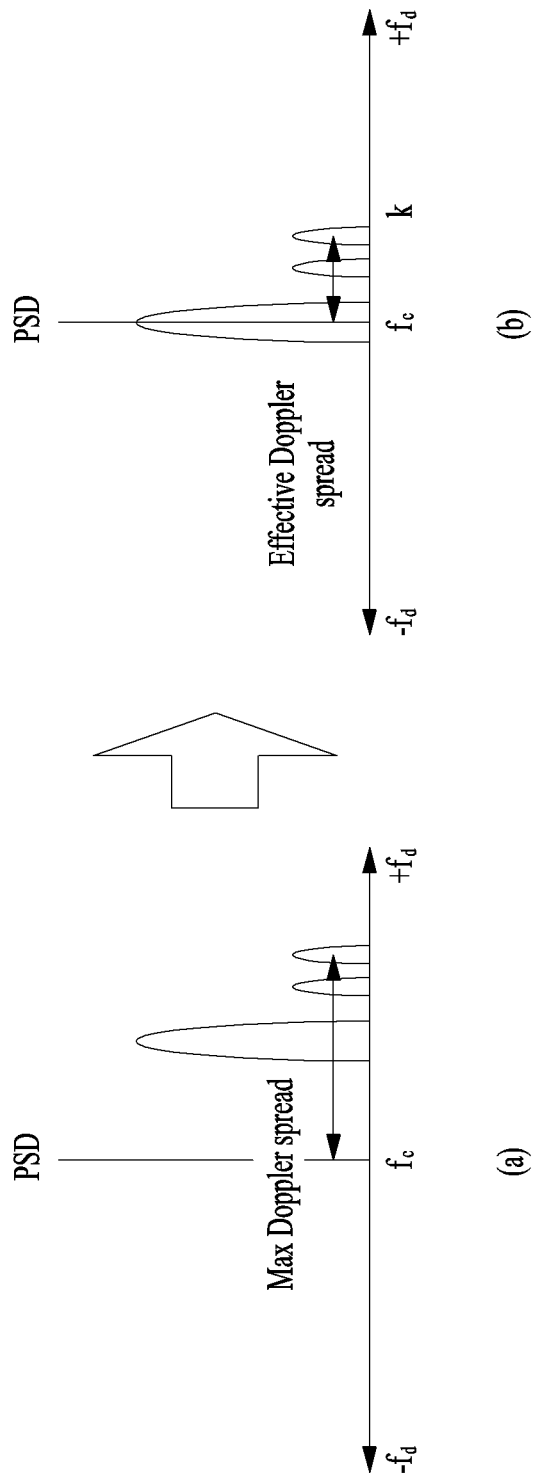
FIG. 11 is a view illustrating a change in a Doppler spread, when a frequency shift value k is corrected by a carrier frequency offset according to an embodiment of the present invention.

FIG. 11 is a view illustrating a change in a Doppler spread, when the frequency shift value k is corrected by a carrier frequency offset according to an embodiment of the present invention.

FIG. 11(a) illustrates a Doppler spread of a signal received at a UE or a reception end. In FIG. 11(a), an arrow indicates a maximum Doppler spread.

FIG. 11(b) illustrates correction of the maximum Doppler spread value illustrated in FIG. 11(a) to an effective Doppler spread value by a carrier frequency offset using a k value calculated in the methods described in Clauses 4.1, 4.2, and 4.3 in the UE or reception end. IN FIG. 11, the horizontal axis represents frequency and the vertical axis represents PSD.

4.4 Doppler Spectrum Estimation Method—4

The UE may use the k value detected according to the methods described in Clauses 4.1, 4.2, and 4.3 to calculate an effective Doppler spread. On the other hand, the UE may feed back the calculated carrier shift value k to the eNB, so that the eNB may determine a transmission mode using k.

Figure 12:
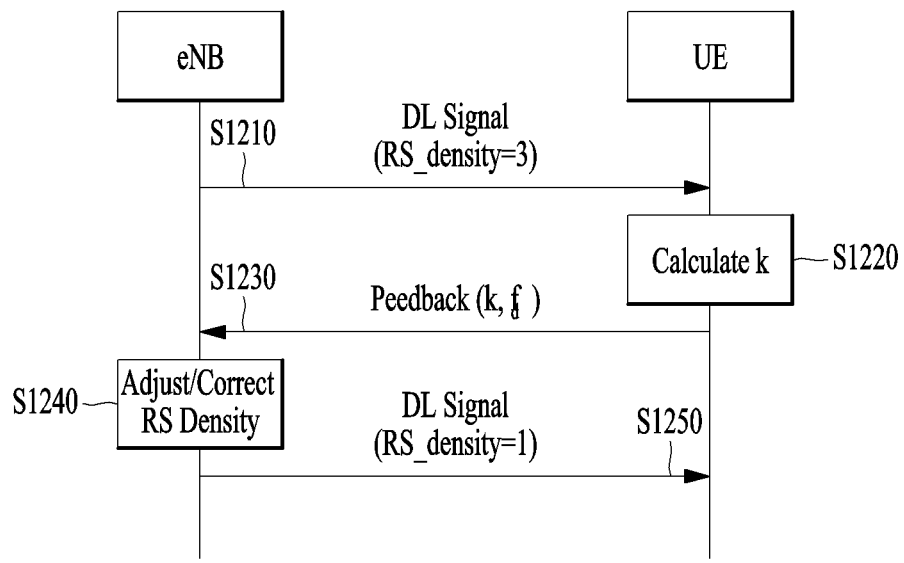
FIG. 12 is a diagram illustrating a signal flow for one of methods for estimating a Doppler spectrum according to an embodiment of the present invention.

FIG. 12 is a diagram illustrating a signal flow for one of methods for estimating a Doppler spectrum according to an embodiment of the present invention.

If the carrier shift value k is large, this means that the Doppler spread can be reduced in a current environment, relative to the conventional technology. Accordingly, the coherence time is longer than a legacy coherence time. Therefore, the eNB may determine an available transmission mode or Channel Status Information (CSI) feedback duration according to the carrier shift value k.

Referring to FIG. 12, the eNB transmits a Reference Signal (RS) and/or a DL signal to the UE. The density of RSs or the density of RSs included in the DL signal is assumed to be 3 (S1210).

The UE may calculate a carrier shift value k based on the received RS and/or DL signal using the methods described in Clauses 4.1 to 4.4 (S1220).

Subsequently, the UE may feed back the calculated carrier shift value k and/or a Doppler spread value $f_d$ to the eNB (S1230).

The carrier shift value k may be fed back in step S1230 using feedback methods available in the LTE/LTE-A system. For example, the carrier shift value k may be fed back during a feedback duration of the rank of a radio channel, a Channel Quality Indicator (CQI), or a Precoding Matrix Index (PMI). However, since the Doppler spread may vary with beam patterns, it is most preferable to feed back the carrier shift value during the PMI feedback duration.

Accordingly, the UE may feed back the carrier shift value k periodically by a PUCCH signal or aperiodically by a PUSCH signal upon request of the eNB.

Or although the UE may quantize the carrier shift value k, the UE may define a normalized frequency value by dividing the carrier shift value k by a subcarrier spacing and quantize the normalized frequency value, for feedback in step S1230.

Referring to FIG. 12 again, the eNB may adjust and/or correct an RS density based on the feedback information received in step S1230 in order to estimate the Doppler spectrum of the DL signal and correct the Doppler spectrum. That is, the eNB may change a DL transmission mode based on the feedback information (S1240).

Then, the eNB may transmit a DL signal in the changed transmission mode to the UE and the UE may receive the DL signal with a mitigated Doppler spread, thereby increasing the reception quality of the DL signal. For example, the DL signal may be transmitted with an RS density changed to 1 (the RS density may be increased according to a channel state) (S1250).

4.5 Doppler Spectrum Estimation Method—5

Now, a description will be given of a method for using an Auto Frequency Controller (AFC) to estimate and/or correct a carrier shift value k.

Figure 13:
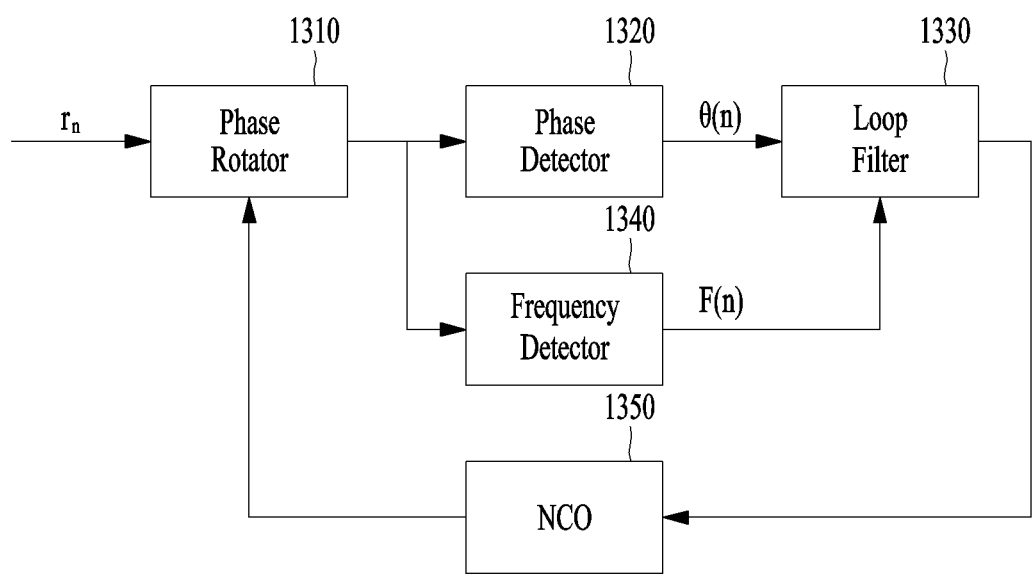
FIG. 13 is a block diagram of an Auto Frequency Controller (AFC) for estimating and/or mitigating a Doppler spectrum according to an embodiment of the present invention.

FIG. 13 is a block diagram of an AFC for estimating and/or mitigating a Doppler spectrum according to an embodiment of the present invention.

The AFC may be provided in a UE or a receiver and may be configured as illustrated in FIG. 13. The AFC functions to set an optimum frequency for estimation and/or mitigation of a Doppler spectrum by controlling a frequency automatically.

The AFC may include a phase rotator 1310 for changing the phase of a received signal, a phase detector 1320 for detecting the phase of the received signal, a frequency detector 1330 for detecting the frequency of the received signal, a loop filter 1340 for preventing a rapid change in the phase and adjusting a change speed by a parameter, and a Numerical Control Oscillator (NCO) 1350 for generating a signal with a corrected frequency and phase.

If the received signal is $r_n$ and a desired signal or RS is $d_n$ in FIG. 13, a phase offset value estimated by the phase detector 1320 may be represented as $\theta(n) = \arctan(r_n d_n^*)$. A frequency offset estimated by the frequency detector 1330 may be represented as $f(n) = \arctan(r_{n-1}^* d_{n-1} r_n d_n^*)$.

The phase offset and frequency offset detected by the phase detector 1320 and the frequency detector 1330 pass through the loop filter 1340 to thereby prevent a rapid phase change. Then, the phase offset and the frequency offset are provided to an input of the NCO 1350 to adjust a change speed by a parameter. Therefore, the NCO may generate a signal with a corrected frequency and phase.

Accordingly, the UE or reception end may mitigate a Doppler spread by estimating and correcting the carrier shift value of a received signal using the AFC.

4. Apparatuses

Figure 14:
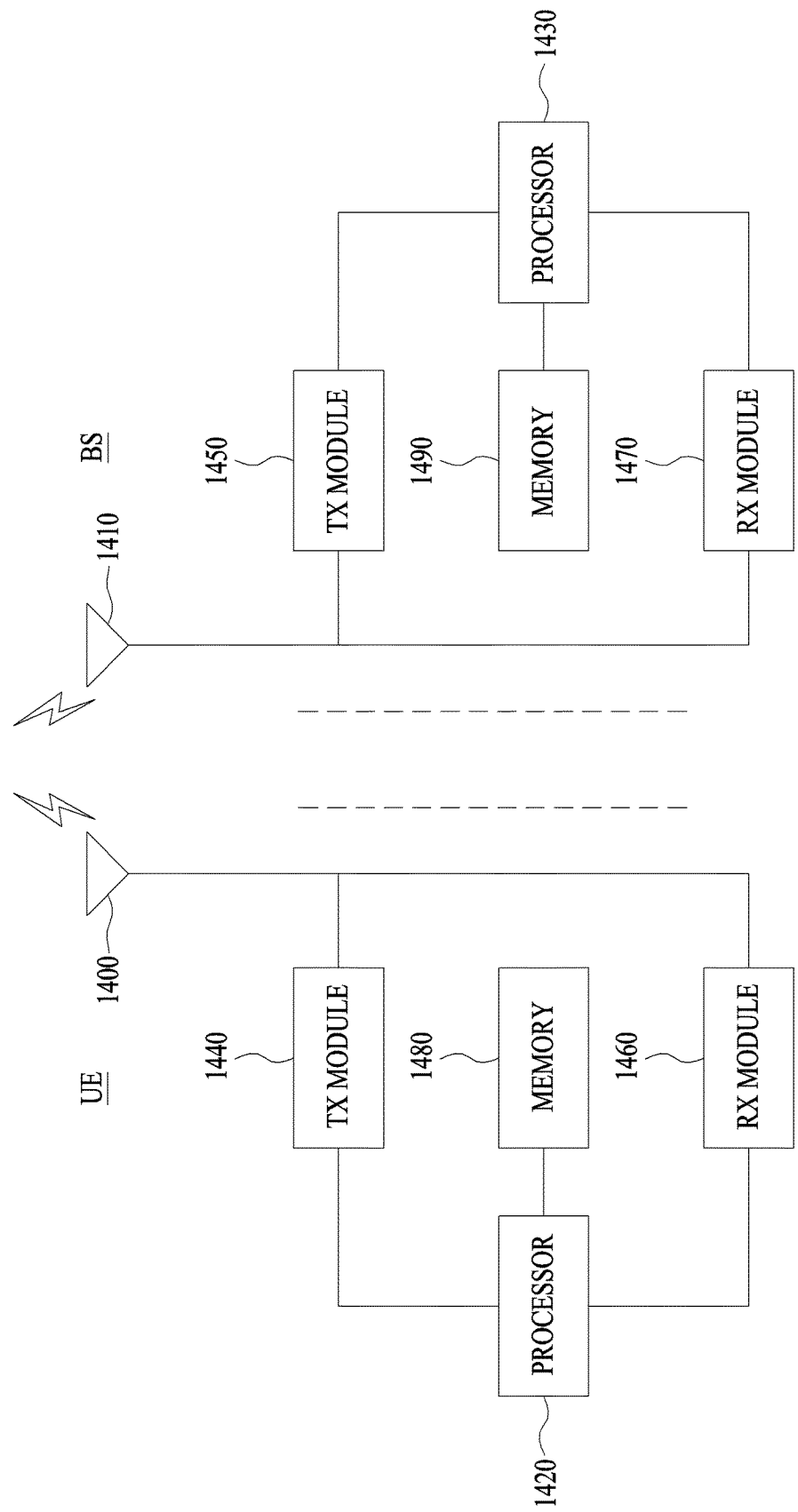
FIG. 14 is a block diagram of apparatuses for implementing the methods described in FIGS. 1 to 13.

Apparatuses illustrated in FIG. 14 are means that can implement the methods described before with reference to FIGS. 1 to 13.

A UE may act as a transmitter on a UL and as a receiver on a DL. A BS may act as a receiver on a UL and as a transmitter on a DL.

That is, each of the UE and the BS may include a Transmission (Tx) module 1440 or 1450 and a Reception (Rx) module 1460 or 1470, for controlling transmission and reception of information, data, and/or messages, and an antenna 1400 or 1410 for transmitting and receiving information, data, and/or messages.

Each of the UE and the BS may further include a processor 1420 or 1430 for implementing the afore-described embodiments of the present invention and a memory 1480 or 1490 for temporarily or permanently storing operations of the processor 1420 or 1430.

The embodiments of the present invention can be implemented using the afore-described components and functions of the UE and the eNB. For example, the processor of the UE and/or the eNB may mitigate a Doppler spread in a wireless access system supporting a super-high frequency band by combining the afore-described methods described in Clauses 1 to 4.

Particularly, the UE may calculate a carrier shift value k by [Equation 2] to [Equation 6] in order to estimate the Doppler spectrum of a received signal. Also, the UE may feed back the calculated carrier shift value k to the eNB so that the eNB may correct and transmit DL data. If the UE estimates the Doppler spectrum in the manner described in Clause 4.5, the AFC may reside in the processor or may be provided outside the processor within the UE and operate in conjunction with the processor.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 11 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for mitigating a Doppler spread in a wireless access system supporting a high frequency band, the method comprising:
    receiving, by a reception end, a downlink signal to which a beamforming scheme is applied from a transmission end;
    estimating a Doppler spectrum of the received downlink signal by the reception end;
    calculating a carrier shift value based on the estimated Doppler spectrum by the reception end; and
    feeding back the carrier shift value to the transmission end according to a time period related to a beam pattern change,
    wherein the carrier shift value is calculated to be an average value of a part of the Doppler spectrum larger than a predetermined threshold.

2. The method according to claim 1, wherein the Doppler spectrum $S_x(f)$ is estimated to be $\Im\{R_{xx}(\tau)\}$, where $R_{xx}(\tau)$ represents an auto-correlation function of the downlink signal and $\Im\{\ \}$ represents Fourier Transform.

3. The method according to claim 1, wherein the carrier shift value is calculated by the following equation, $$a = \frac{1}{f_{max} - f_{min}} \int_{-f_d}^{+f_d} S_x(f)\,df \qquad \text{[Equation]}$$
$$S_x^{-1}(a) = k$$
$$f_{min} = \min(f) \text{ when } S_x(f) > \text{threshold}$$
$$f_{max} = \max(f) \text{ when } S_x(f) > \text{threshold}.$$

4. The method according to claim 1, wherein the carrier shift value is calculated by the following equation, $$k = \frac{f_{max} - f_{min}}{2}, \quad \begin{matrix} f_{min} = \min(f) \text{ when } S_x(f) > \text{threshold} \\ f_{max} = \max(f) \text{ when } S_x(f) > \text{threshold} \end{matrix} \qquad \text{[Equation]}$$

5. The method according to claim 1, wherein the predetermined threshold is a constant fixed value in the system, is determined based on a maximum value of the Doppler spectrum, or is received by higher-layer signaling.

6. The method according to claim 1, further comprising:
    receiving a downlink signal corrected based on the carrier shift value from the transmission end by the reception end.

7. A reception end for mitigating a Doppler spread in a wireless access system supporting a high frequency band, the reception end comprising:
- a transmitter;
- a receiver; and
- a processor configured to mitigate the Doppler spread,
- wherein the processor is configured to
  - control the receiver to receive a downlink signal to which a beamforming scheme is applied from a transmission end,
  - estimate a Doppler spectrum of the received downlink signal,
  - calculate a carrier shift value based on the estimated Doppler spectrum, and
  - control the transmitter to feeds back the carrier shift value by controlling the transmitter to a transmission end according to a time period related to a beam pattern change,
  - wherein the carrier shift value is calculated to be an average value of a part of the Doppler spectrum larger than a predetermined threshold.

8. The reception end according to claim 7, wherein the Doppler spectrum $S_x(f)$ is estimated to be $\Im\{R_{xx}(\tau)\}$ where $R_{xx}(\tau)$ represents an auto-correlation function of the downlink signal and $\Im\{\ \}$ represents Fourier Transform.

9. The reception end according to claim 7, wherein the carrier shift value is calculated by the following equation, $$a = \frac{1}{f_{max} - f_{min}} \int_{-f_d}^{+f_d} S_x(f) df \quad \text{[Equation]}$$

$$S_x^{-1}(a) = k$$

$f_{min} = \min(f)$ when $S_x(f) >$ threshold
$f_{max} = \max(f)$ when $S_x(f) >$ threshold.

10. The reception end according to claim 7, wherein the carrier shift value is calculated by the following equation, $$k = \frac{f_{max} - f_{min}}{2}, \quad \begin{matrix} f_{min} = \min(f) \text{ when } S_x(f) > \text{threshold} \\ f_{max} = \max(f) \text{ when } S_x(f) > \text{threshold} \end{matrix} \quad \text{[Equation]}$$

11. The reception end according to claim 7, wherein the predetermined threshold is a constant fixed value in the system, is determined based on a maximum value of the Doppler spectrum, or is received by higher-layer signaling.

12. The reception end according to claim 7,
wherein the processor is further configured to control the receiver to receive a downlink signal corrected based on the carrier shift value from the transmission end.

* * * * *